(12) United States Patent
Kim et al.

(10) Patent No.: US 6,618,443 B1
(45) Date of Patent: *Sep. 9, 2003

(54) UPSAMPLING FILTER FOR A DOWN CONVERSION SYSTEM

(75) Inventors: Hee-Yong Kim, Plainsboro, NJ (US); Edwin Robert Meyer, Bensalem, PA (US); Saiprasad Naimpally, Langhorne, PA (US); Larry Phillips, Cherry Hill, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/169,297

(22) Filed: Oct. 9, 1998

Related U.S. Application Data

(63) Continuation-in-part of application No. 08/815,804, filed on Mar. 12, 1997, now Pat. No. 6,175,592.

(51) Int. Cl.[7] .................................................. H04N 7/12
(52) U.S. Cl. .................................................. 375/240.21
(58) Field of Search ....................... 375/240.01, 240.16, 375/240.18, 240.21, 240.26; 382/250; H04N 7/12

(56) References Cited

U.S. PATENT DOCUMENTS

| | | |
|---|---|---|
| 3,997,772 A | 12/1976 | Crochiere et al. |
| 4,468,688 A | 8/1984 | Gabriel et al. |
| 4,472,732 A | 9/1984 | Bennett et al. |

(List continued on next page.)

FOREIGN PATENT DOCUMENTS

| | | |
|---|---|---|
| EP | 0 515 143 A2 | 11/1992 |
| EP | 0 598 184 A2 | 5/1994 |
| EP | 0707426 A2 | 4/1996 |
| EP | 0993198 | 4/2000 |
| JP | 0508613 | 11/1993 |
| JP | 10262252 | 9/1998 |
| WO | WO97/01934 | 1/1997 |
| WO | WO9841011 | 9/1998 |

OTHER PUBLICATIONS

Aldo Cugnini et al. "MPEG–2 Video Decoder for the Digital HDTV Grand Alliance System" *IEEE Trans–Actions on Consumer Electronics*, vol. 41, Aug., 1995, No. 3. New York, US.

Jill Boyce et al. SDTV Receivers with HDTV Decoding Capability Feb. 1995, ACATS Technical Subgroup Meeting, May 1995, Washington DC.

(List continued on next page.)

*Primary Examiner*—Young Lee
(74) *Attorney, Agent, or Firm*—RatnerPrestia

(57) ABSTRACT

An HDTV down conversion system including apparatus for forming a set of low resolution down-sampled pixel values corresponding to a current frame of a video signal from a set of low resolution pixel values corresponding to a residual image of a current frame of the video signal and from a set of down-sampled low resolution pixel values corresponding to reference frames of the video signal. The apparatus includes a memory for storing the set of down-sampled low resolution pixel values. An up-sampling processor receives from the memory and uses Lagrangian interpolation to convert the set of down-sampled low resolution pixel values corresponding to the reference frame of the video signal into a set of up-sampled low resolution pixel values corresponding to the reference frame of the video signal. A summing processor adds the set of low resolution pixel values corresponding to the residual image of the current frame of the video signal to the set of up-sampled low resolution pixel values corresponding to the reference frame of the video signal to form a set of low resolution pixel values corresponding to the current frame of the video signal. A decimating processor deletes selected ones of the set of low resolution pixel values corresponding to the current frame to generate the set of low resolution down-sampled pixel values corresponding to the current frame of the video signal.

12 Claims, 13 Drawing Sheets

U.S. PATENT DOCUMENTS

| | | | |
|---|---|---|---|
| 4,472,785 A | | 9/1984 | Kasuga |
| 4,536,745 A | | 8/1985 | Yamaguchi et al. |
| 4,652,908 A | | 3/1987 | Fling et al. |
| 4,774,581 A | | 9/1988 | Shiratsuchi |
| 4,870,661 A | | 9/1989 | Yamada et al. |
| 4,908,874 A | | 3/1990 | Gabriel |
| 5,057,911 A | | 10/1991 | Stec et al. |
| 5,262,854 A | | 11/1993 | Ng |
| 5,274,372 A | | 12/1993 | Luthra et al. |
| 5,327,235 A | | 7/1994 | Richards |
| 5,331,346 A | | 7/1994 | Shields et al. |
| 5,389,923 A | | 2/1995 | Iwata et al. |
| 5,477,397 A | | 12/1995 | Naimpally et al. |
| 5,481,568 A | | 1/1996 | Yada |
| 5,483,474 A | | 1/1996 | Arbeiter et al. |
| 5,489,903 A | | 2/1996 | Wilson et al. |
| 5,528,301 A | | 6/1996 | Hau et al. |
| 5,613,084 A | | 3/1997 | Hau et al. |
| 5,614,952 A | * | 3/1997 | Boyce et al. .......... 375/240.01 |
| 5,737,019 A | | 4/1998 | Kim |
| 6,141,059 A | * | 10/2000 | Boyce et al. |
| 6,141,456 A | * | 10/2000 | Pearlstein et al. .......... 382/250 |
| 6,175,592 B1 | | 1/2001 | Kim et al. |
| 6,184,935 B1 | * | 2/2001 | Iaquinto et al. ........ 375/240.16 |
| 6,249,549 B1 | * | 6/2001 | Kim ...................... 375/240.21 |

OTHER PUBLICATIONS

K. Blair Benson et al. Television Engineering Handbook featuring HDTV Systems (Revised Edition), pp 18.2 to 18.7 1986 McGraw/Hill 18.

Jill Boyce et al. Low–Cost All Format ATV Decoding with Improved Quality, Hitachi America, Ltd, Princeton, N.J., 30th SMPTE Advanced Motion Imaging Conference, Paper #11, Feb. 2, 1996.

Jack S. Fuhrer, The All Format Decoder, Hitachi America, Ltd. Jun. 3, 1996.

Recommended Practices for Video Encoding Using the ATSC Digital Televion Standard—Consideration of Down-sampling Decoders, SMPTE Jun. 6, 1996.

High Performance Multirate Digital Filter, GENNUM Corporation, Ontario, Canada, Doc No. 520–64–5.

European Search Report, Jun. 27, 2001.

Siu–Leong Iu; "Comparison of Motion Compensation Using Different Degrees of Sub–Pixel Accuracy For Interfield/Interframe Hybrid Coding of HDTV Image Sequences"; ICASSP; IEEE vol. CONF. 17, Mar. 23, 1992; pp. 465–468.

S. Suthaharn et al.; "A New Post–Filtering Technique for Block–Based Transform Coded Images"; IEEE Tencon—Digital Signal Processing applications, Nov. 26, 1996; pp. 702–705.

Hee–Yong Kim et al.; "DCT Domain Filter for ATV Down Conversion"; IEEE Transaction on Consumer Electronics, vol. 43, No. 4; Nov. 1, 1997; pp. 1074–1078.

M. Winzker et al.; "Architecture and Memory Requirements for Stand–Alone and Hierarchical MPEG2 HDTV–Decoders with Synchronous Drams"; IEEE International Symposium on Circuits and Systems; Apr. 30, 1995; pp. 609–612.

* cited by examiner

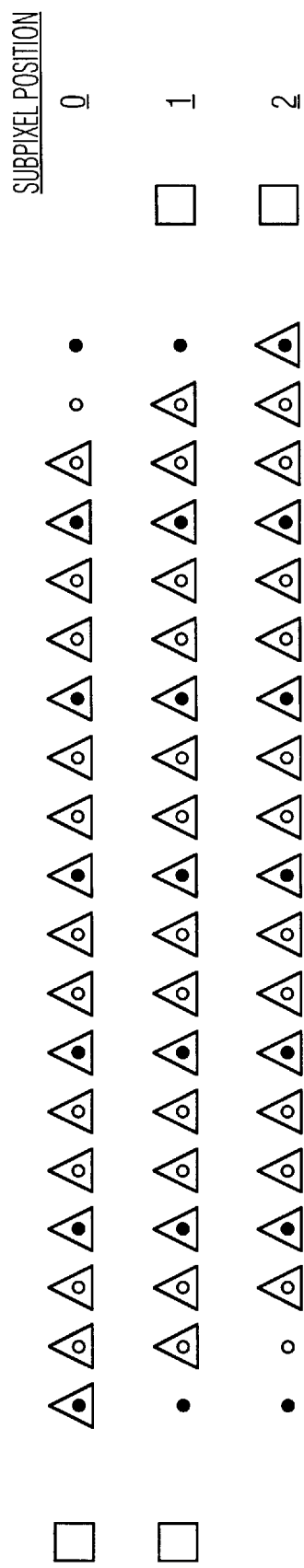
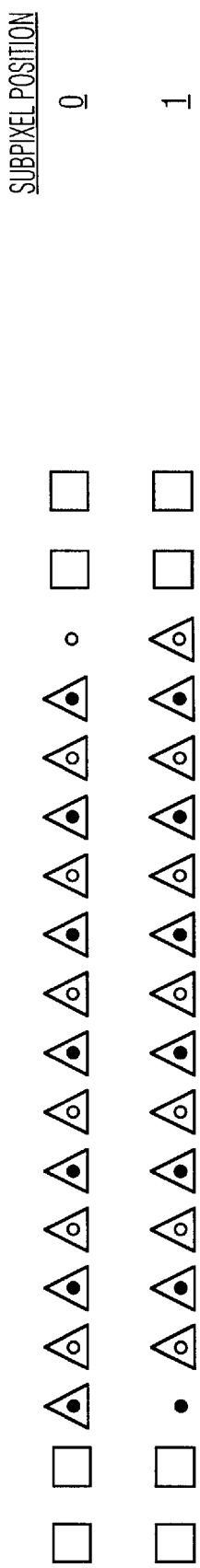
FIG. 3A

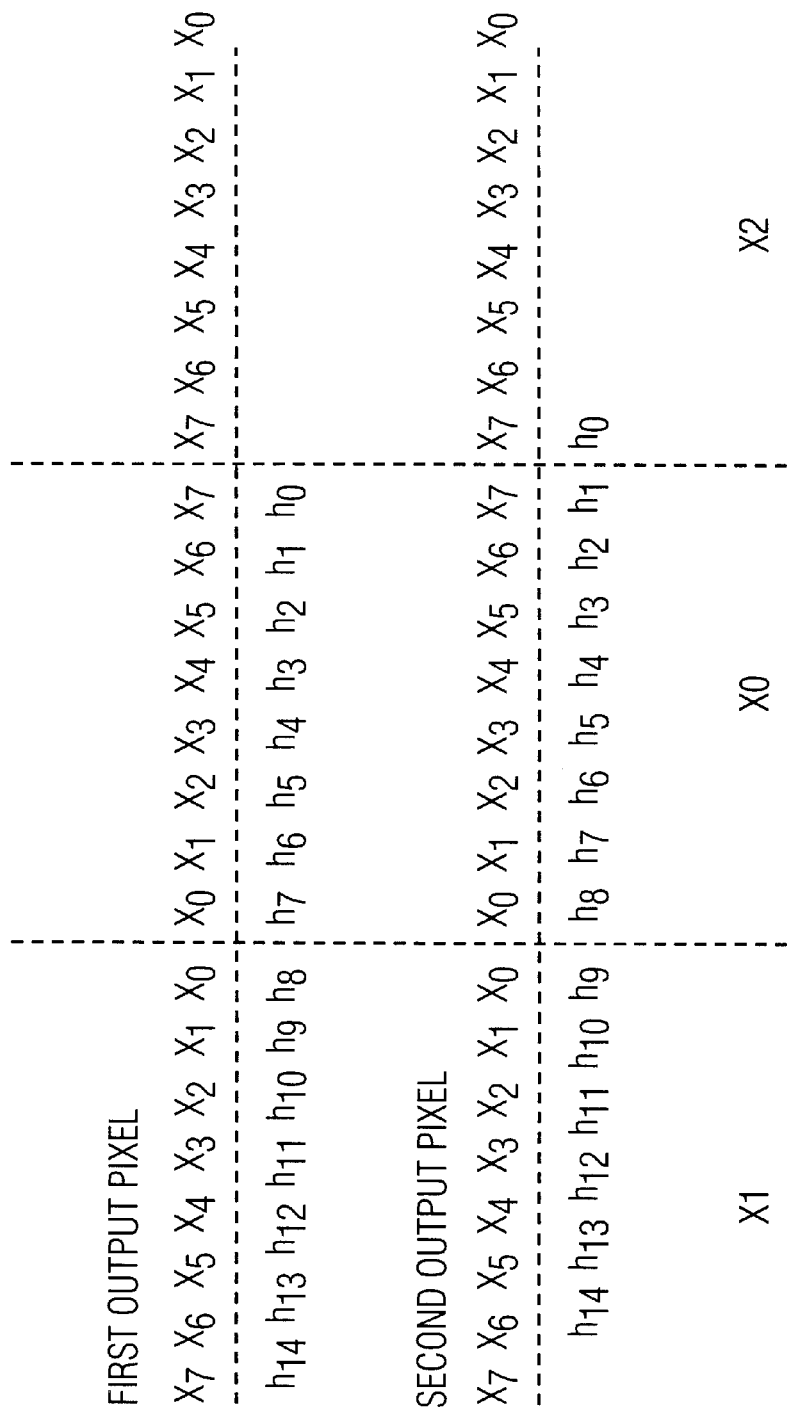

UPSAMPLING FILTER FOR A DOWN CONVERSION SYSTEM

This application is a continuation-in-part of application Ser. No. 08/815,804 filed on Mar. 12, 1997 and issued as U.S. Pat. No. 6,175,592 B1 on Jan. 16, 2001 and claims the benefit of the earlier filing date.

FIELD OF THE INVENTION

The present invention relates to a decoder which converts and formats an encoded high resolution video signal, e.g. MPEG-2 encoded video signals, to a decoded lower resolution output video signal, and more specifically to an up-sampling filter for the decoder.

BACKGROUND OF THE INVENTION

In the United States a standard has been proposed for digitally encoded high definition television signals (HDTV). A portion of this standard is essentially the same as the MPEG-2 standard, proposed by the Moving Picture Experts Group (MPEG) of the International Organization for Standardization (ISO). The standard is described in an International Standard (IS) publication entitled, "Information Technology—Generic Coding of Moving Pictures and Associated Audio, Recommendation H.626", ISO/IEC 13818-2, IS, 11/94 which is available from the ISO and which is hereby incorporated by reference for its teaching on the MPEG-2 digital video coding standard.

The MPEG-2 standard is actually several different standards. In MPEG-2, several different profiles are defined, each corresponding to a different level of complexity of the encoded image. For each profile, different levels are defined, each level corresponding to a different image resolution. One of the MPEG-2 standards, known as Main Profile, Main Level is intended for coding video signals conforming to existing television standards (i.e., NTSC and PAL). Another standard, known as Main Profile, High Level, is intended for coding high-definition television images.

Images encoded according to the Main Profile, High Level standard may have as many as 1,152 active lines per image frame and 1,920 pixels per line.

The Main Profile, Main Level standard, on the other hand, defines a maximum picture size of 720 pixels per line and 576 lines per frame. At a frame rate of 30 frames per second, signals encoded according to this standard have a data rate of 720 * 576 * 30 or 12,441,600 pixels per second. By contrast, images encoded according to the Main Profile, High Level standard have a maximum data rate of 1,152 * 1,920 * 30 or 66,355,200 pixels per second. This data rate is more than five times the data rate of image data encoded according to the Main Profile, Main Level standard. The standard proposed for HDTV encoding in the United States is a subset of this standard, having as many as 1,080 lines per frame, 1,920 pixels per line and a maximum frame rate, for this frame size, of 30 frames per second. The maximum data rate for this proposed standard is still far greater than the maximum data rate for the Main Profile, Main Level standard.

The MPEG-2 standard defines a complex syntax which contains a mixture of data and control information. Some of this control information is used to enable signals having several different formats to be covered by the standard. These formats define images having differing numbers of picture elements (pixels) per line, differing numbers of lines per frame or field, and differing numbers of frames or fields per second. In addition, the basic syntax of the MPEG-2 Main Profile defines the compressed MPEG-2 bit stream representing a sequence of images in five layers, the sequence layer, the group of pictures layer, the picture layer, the slice layer and the macroblock layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

A down conversion system converts a high definition input picture into lower resolution picture for display on a lower resolution monitor. Down conversion of high resolution Main Profile, High Level pictures to Main Profile, Main Level pictures, or other lower resolution picture formats, has gained increased importance for reducing implementation costs of HDTV. Down conversion allows replacement of expensive high definition monitors used with Main Profile, High Level encoded pictures with inexpensive existing monitors which have a lower picture resolution to support, for example, Main Profile, Main Level encoded pictures, such as NTSC or 525 progressive monitors.

To effectively receive the digital images, a decoder should process the video signal information rapidly. To be optimally effective, the coding systems should be relatively inexpensive and yet have sufficient power to decode these digital signals in real time.

One method of down conversion of the prior art simply low pass filters and decimates the decoded high resolution, Main Profile, High Level picture to form an image suitable for display on a conventional television receiver. Consequently, using existing techniques, a decoder employing down conversion may be implemented using a single processor having a complex design, considerable memory, and operating on the spatial domain image at a high data rate to perform this function. The high resolution, and high data rate, however, requires very expensive circuitry, which would be contrary to the implementation of a decoder in a consumer television receiver in which cost is a major factor.

SUMMARY OF THE INVENTION

An apparatus for forming a set of low resolution down-sampled pixel values corresponding to a current frame of a video signal from a set of low resolution pixel values corresponding to a residual image of the current frame of the video signal and from a set of down-sampled low resolution pixel values corresponding to a reference frame of the video signal. The apparatus includes a memory means for storing the set of down-sampled low resolution pixel values corresponding to the reference frame of the video signal. An up-sampling means receives from the memory means and uses Lagrangian interpolation to convert the set of down-sampled low resolution pixel values corresponding to the reference frame of the video signal into a set of up-sampled low resolution pixel values corresponding to the reference frame of the video signal. A summing means adds the set of low resolution pixel values corresponding to the residual image of the current frame of the video signal to the set of up-sampled low resolution pixel values corresponding to the reference frame of the video signal to form a set of low resolution pixel values corresponding to the current frame of the video signal. A decimating means deletes selected ones of the set of low resolution pixel values corresponding to the current frame of the video signal to generate the set of low resolution down-sampled pixel values corresponding to the current frame of the video signal.

BRIEF DESCRIPTION OF THE DRAWINGS

These and other features and advantages of the present invention will become apparent from the following detailed description, taken in conjunction with the accompanying drawings, wherein:

FIG. 3A illustrates subpixel positions and corresponding predicted pixels for exemplary embodiments of 3:1 and 2:1 down conversion systems;

FIG. 9 illustrates the multiplication pairs for the first and second output pixel values of an exemplary embodiment of a block mirror filter;

DETAILED DESCRIPTION

I. DECODER OVERVIEW

The exemplary embodiment of the invention filters decoded HDTV signals which have been encoded according to the MPEG-2 standard and in particular, the Main Profile, High Level MPEG-2 standard.

The invention described herein, however, is not limited to down conversion filtering of decoded HDTV signals. The filtering method described below may also be used to filter other types of frequency-domain encoded digital signals which may be divided into sections, filtered, and then recombined.

The MPEG-2 Main Profile standard defines a sequence of images in five levels: the sequence level, the group of pictures level, the picture level, the slice level and the macroblock level. Each of these levels may be considered to be a record in a data stream, with the later-listed levels occurring as nested sub-levels in the earlier listed levels. The records for each level include a header section which contains data that is used in decoding its sub-records.

Macroblocks are composed of six blocks, 4 luminance blocks Y and 2 chrominance blocks, Cr and Cb. Each block of the encoded HDTV signal contains data representing 64 respective coefficient values of a two dimensional discrete cosine transform (DCT) representation of 64 picture elements (pixels) in the HDTV image.

In the encoding process, the pixel data is subject to motion compensated differential coding prior to the discrete cosine transformation and the blocks of transformed coefficients are further encoded by applying run-length and variable length encoding techniques. A decoder which recovers the image sequence from the data stream reverses the encoding process. This decoder employs an entropy decoder (e.g. a variable length decoder), an inverse discrete cosine transform processor, a motion compensation processor, and an interpolation filter.

Figure 1:
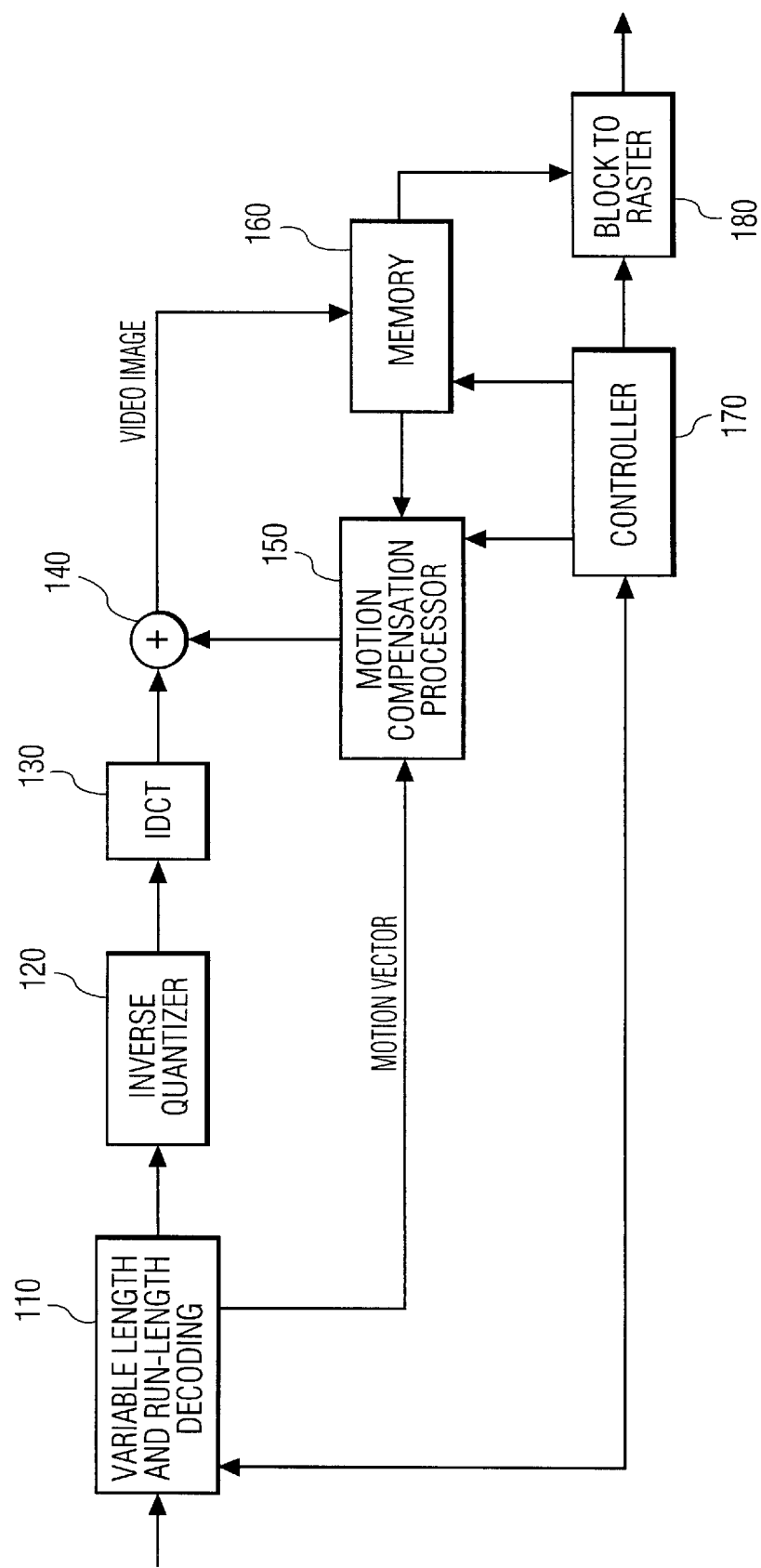
FIG. 1 is a high level block diagram of a video decoding system of the prior art.

FIG. 1 is a high level block diagram of a typical video decoding system of the prior art. The video decoder of the prior art includes an entropy decoder 110, which is usually a variable length decoder and a run length decoder, an inverse quantizer 120, and an inverse discrete cosine transform (IDCT) processor 130. The exemplary system also includes a controller 170 which controls the various components of the decoding system responsive to the control information retrieved from the input bit stream by the entropy decoder 110. For processing of prediction images, the prior art system further includes a memory 160, adder 140, a motion compensation processor 150, and a block to raster converter 180.

The variable length decoder 110 receives the encoded video image signal, and reverses the encoding process to produce control information including motion vectors describing the relative displacement of a matching macroblock in a previously decoded image. This matching macroblock corresponds to a macroblock of the predicted picture that is currently being decoded. The variable length decoder 110 also receives the quantized DCT transform coefficients of the blocks of either the current video image, if intraframe encoding is used, or the difference between the current and the predicted video image which is referred to as the residual image, if interframe encoding is used. The inverse quantizer 120 receives the quantized DCT transform coefficients and reconstructs the quantized DCT coefficients for a particular macroblock. The quatization matrix to be used for a particular block is received from the variable length decoder 110.

The IDCT processor 130 transforms the reconstructed DCT coefficients to pixel values in the spatial domain (for each block of 8×8 matrix values representing luminance or chrominance components of the macroblock, and for each block of 8×8 matrix values representing the differential luminance or differential chrominance components of the predicted macroblock).

If the current macroblock is not predictively encoded, then the output matrix values are the pixel values of the corresponding macroblock of the current video image. If the macroblock is interframe encoded, the corresponding macroblock of the previous video picture frame (a reference frame) is stored in memory 160 for use by the motion compensation processor 150. The motion compensation processor 150 receives the previous macroblock from memory 160 responsive to the motion vector which is received from the entropy decoder 110. The motion compensation processor 150 then adds the previous macroblock to the current IDCT transformed macroblock (corresponding to a residual component of the present predictively encoded frame) in adder 140 to produce the corresponding macroblock of pixels for the current video image, which is then stored into the memory 160.

II. DOWN CONVERSION SYSTEM

A. Overview

Figure 2:
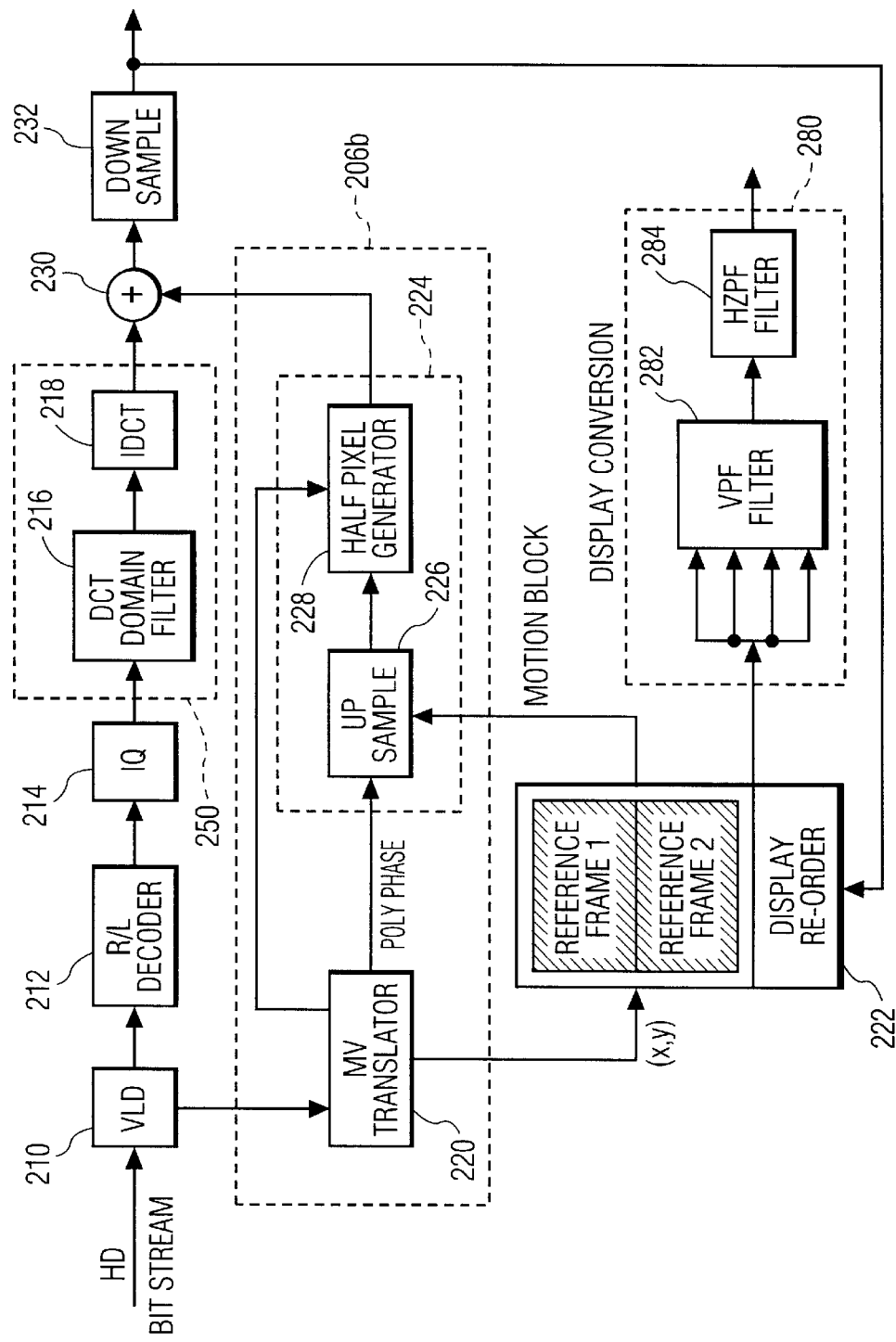
FIG. 2 is a high level block diagram of an exemplary embodiment of a down conversion system.

FIG. 2 is a high level block diagram of an exemplary embodiment of a down conversion system. As shown in FIG. 2, the down conversion system includes a variable length decoder (VLD) 210, a run-length (R/L) decoder 212, an inverse quantizer 214, and an inverse discrete cosine transform (IDCT) processor 218. In addition, the down conversion system includes a down conversion filter (DCT filter) 216 and down sampling processor 232 for filtering of encoded pictures. While the following describes the exemplary embodiment for a Main Profile, High Level encoded input, the down conversion system may be implemented with any similarly encoded high resolution image bit stream.

The down conversion system also includes a motion vector (MV) translator 220, a high resolution motion block generator 224 including up-sampling processor 226 and half-pixel generator 228 and a reference frame memory 222.

In addition, the system includes a display conversion block 280 including a vertical programmable filter (VPF) 282 and horizontal programmable filter (HZPF) 284. The display conversion block 280 converts downsampled images into images for display on a particular display having a lower resolution.

The down conversion filter 216 performs a lowpass filtering of the high resolution (e.g. Main Profile, High Level DCT) coefficients in the frequency domain. The down sampling processor 232 eliminates spatial pixel values by decimation of the lowpass filtered Main Profile, High Level picture to produce a set of pixel values which can be displayed on a monitor having lower resolution than that required to display a Main Profile, High Level picture. The exemplary reference frame memory 222 stores the spatial pixel values corresponding to at least one previously decoded reference frame having a resolution corresponding to the down-sampled picture. For non-intra macroblock encoding, the MV translator 220 scales the motion vectors for each block of the received picture consistent with the reduction in resolution, and the low resolution motion block generator 224 receives the decimated low resolution motion blocks provided by the reference frame memory 222, up-samples these motion blocks and generates half pixel values to provide motion blocks at the half pixel accuracy which exhibit good spatial correspondence to the decoded and filtered differential pixel blocks.

The operation of this exemplary embodiment of a down conversion system for intra-macroblock encoding is now described. The Main Profile, High Level bit-stream is received and decoded by VLD 210. In addition to header information used by the HDTV system, the VLD 210 provides DCT coefficients for each block and macroblock, and motion vector information. The DCT coefficients are run length decoded in the R/L decoder 212 and inverse quantized by the inverse quantizer 214. The VLD 210 and R/L decoder 212 correspond to the entropy decoder 110 of FIG. 1.

Since the received video image represented by the DCT coefficients is a high resolution picture, the DCT coefficients of each block are lowpass filtered before decimation of the high resolution video image. The inverse quantizer 214 provides the DCT coefficients to the DCT filter 216 which performs a lowpass filtering in the frequency domain by weighting the DCT coefficients with predetermined filter coefficient values before providing them to the IDCT processor 218. In an exemplary embodiment, this filter operation is performed on a block by block basis.

The IDCT processor 218 provides spatial pixel values by performing an inverse discrete cosine transform of the filtered DCT coefficients. The down sampling processor 232 reduces the picture sample size by eliminating spatial pixel sample values according to a predetermined decimation ratio; therefore, storing the lower resolution picture uses a smaller frame memory 222 compared to that which would be needed to store the higher resolution Main Profile, High Level picture.

The operation of this exemplary embodiment of a down conversion system for non-intra macroblock encoding is now described. In this exemplary embodiment, following the MPEG standard, the DCT coefficients of the current received image represent the DCT coefficients of the residual components of the predicted image macroblocks. The predicted image macroblocks can be forward, backward, and bi-directionally predicted. In a bi-directional case, for example, a forward predicted image macroblock and a backward predicted image macroblock may be averaged to provide the bi-directionally predicted image macroblock. The horizontal components of the motion vectors for a predicted frame are scaled since the down sampled low resolution reference pictures of previous frames stored in memory do not have the same number of pixels as the high resolution predicted frame (Main Profile, High Level).

Referring to FIG. 2, the motion vectors of the Main Profile, High Level bit stream provided by the VLD 210 are provided to the MV translator 220. Each motion vector is scaled by the MV translator 220 to reference the appropriate prediction block of the reference frame of a previous image stored in reference frame memory 222. The size (number of pixel values) in the retrieved block is smaller than a block of the corresponding high resolution block used to encode the current image; consequently, the retrieved block is up-sampled to form a prediction block having the same number of pixels as the residual block provided by the IDCT processor 218.

The forward or backward prediction block is up-sampled by the up-sampling processor 226 responsive to a control signal from the MV translator 220 to generate a block corresponding to the original high resolution block of pixels. Then, half pixel values are generated, if indicated by the motion vector for the up-sampled prediction block in the half-pixel generator 228, to ensure proper spatial alignment of the prediction block. In the bi-directional case, for example, the forward and backward predicted image macroblocks of upsampled pixels may be averaged to provide a bi-directionally predicted image macroblock. The up-sampled and aligned prediction block is added in adder 230 to the current filtered block, which is, for this example, the reduced resolution residual component from the predicted block. All the processing is done on a macroblock by macroblock basis. After the motion compensation process is complete for the current macroblock in the upsampling domain, the reconstructed macroblock is decimated accordingly in the down sampling processor 232. This process does not reduce the resolution of the image but simply removes redundant pixels from the low resolution filtered image.

Once the downsampled macroblocks for an image are available, the display conversion block 280 adjusts the image for display on a low resolution television display by filtering the vertical and horizontal components of the down-sampled image in the VPF 282 and the HZPF 284 respectively.

B. Macroblock Prediction

Since the reference frames of previous images are down sized, the received motion vectors pointing to these frames may also be translated according to the conversion ratio. The following describes the motion translation for the luminance block, for example, in the horizontal direction. One skilled in the art would easily extend the following discussion to motion translation in the vertical direction if used. Denoting x and y as the current macroblock address in the original image frame, Dx as the horizontal decimation factor and $mv_x$ as the half pixel horizontal motion vector of the original image frame, the address of the top left pixel of the motion block in the original image frame, denoted as XH in the half pixel unit, is given by (1):

$$XH = 2x + mv_x \quad (1)$$

The pixel corresponding to the motion block starts in the down-sampled image, whose address is denoted as x* and y* in the pixel unit given in (2).

$$x^* = \frac{XH}{2 \cdot Dx}; \; y^* = y \quad (2)$$

Because the exemplary DCT filter 216 and down sampling processor 232 only reduce the horizontal components of the image, the vertical component of the motion vector is not affected. For the chrominance, the motion vector is a half of a luminance motion vector in the original picture. Therefore, definitions for translating the chrominance motion vector may also use the two equations (1) and (2).

Motion prediction is done by a two step process: first, pixel accuracy motion estimation in the original image frame restored by up-sampling the down-sampled image frame in the up-sampling processor 226 of FIG. 2, then the half-pixel generator 228 performs a half pixel motion estimation by averaging of nearest pixel values.

Subpixels in a decimated picture, which correspond to pixels in an original pixture, are interpolated, for example, using an up-sampling polyphase filter in the up-sampling processor 226, which gives a motion prediction in the original picture. The motion prediction is added in adder 230 to an output of the IDCT processor 218. Since the output values of the adder 230 correspond to an image in the upsampled original picture format, these values may be downsampled for display on a display having a lower resolution. Downsampling in the down sampling processor 232 is substantially equivalent to subsampling of an image frame, but adjustments may be made based upon the conversion ratio. For example, in the case of 3:1 downsampling, the number of horizontally downsampled pixels are 6 or 5 for each input macroblock, and the first downsampled pixels are not always the first pixel in the input macroblock.

After acquiring the correct motion prediction block from the down-sampled image, up-sampling is needed to get the corresponding prediction block in the original picture. Consequently, subpixel accuracy in motion block prediction is desirable in the down sampled picture. For example, using 3:1 decimation, it is desirable to have ⅓(or ⅙) subpixel accuracy in the motion prediction. The subpixel which is a first pixel required by the motion vector, in addition to the down-sampled motion block, is determined. Then, subsequent subpixel positions are determined using modulo arithmetic as described in the following. The subpixel positions are denoted as $x_s$ as given in (3):

$$X_s = \left(\frac{XH}{2}\right) \% (Dx) \quad (3)$$

where "%" represents modulo division.

For example, the ranges of $x_s$ are 0, 1, 2 for 3:1 up-sampling and 0, 1 for 2:1 up-sampling. FIG. 3A shows subpixel positions and corresponding 17 predicted pixels for the 3:1 and 2:1 examples, and Table 1 gives the legend for FIG. 3A.

TABLE 1

| Symbol | Pixel |
|--------|-------|
| * | Downsampled Pixel |
| Δ | Upsampled Pixel |
| ○ | Prediction Pixel |
| □ | Extra Right and Left Pixels for Upsampling |

As previously described, the up-sampling filters may be up-sampling polyphase filters, and Table 2A gives characteristics of these up-sampling polyphase interpolation filters.

TABLE 2A

|  | 3:1 Upsampling | 2:1 Upsampling |
|---|---|---|
| Number of Polyphase Filters | 3 | 2 |
| Number of Taps | 3 | 5 |
| Maximum number of horizontal downsampled pixels | 9 | 13 |

Tables 2B and 2C below, show exemplary polyphase filter coefficients for the exemplary 3:1 and 2:1 up-sampling polyphase equi-ripple filters.

TABLE 2B

| 3:1 Up-sampling Filter | | | |
|---|---|---|---|
|  | Phase 0 | Phase 1 | Phase 2 |
| Double Precision | −0.1638231735591 | 0.0221080691070 | 0.3737642376078 |
|  | 0.7900589359512 | 0.9557838617858 | 0.7900589359512 |
|  | 0.3737642376078 | 0.0221080691070 | −0.1638231735591 |
| Fixed Point (9 bits) | −0.1640625 (−42) | 0.0234375 (6) | 0.3750000 (96) |
|  | 0.7890625 (202) | 0.95703125 (244) | 0.7890625 (202) |
|  | 0.3750000 (96) | 0.0234375 (6) | −0.1640625 (−42) |

TABLE 2C

| 2:1 Up-sampling Filter | | |
|---|---|---|
|  | Phase 0 | Phase 1 |
| Double Precision | 0.0110396839260 | −0.1433363887113 |
|  | 0.0283886402920 | 0.6433363887113 |
|  | 0.9211433515636 | 0.6433363887113 |
|  | 0.0283886402920 | −0.1433363887113 |
|  | 0.0110396839260 | 0.0000000000000 |
| Fixed Point (9 bits) | 0.01718750 (3) | −0.14453125 (−37) |
|  | 0.02734375 (7) | 0.64453125 (165) |
|  | 0.92187500 (236) | 0.64453125 (165) |

TABLE 2C-continued

2:1 Up-sampling Filter

| Phase 0 | Phase 1 |
|---|---|
| 0.02734375 (7) | −0.14453125 (−37) |
| 0.01718750 (3) | 0.00000000 (0) |

Although the exemplary coefficients in Tables 2B and 2C are given for equi-ripple filters, other filters may be used for interpolating decimated pixels. For example, in section II.C., the design considerations regarding choosing an appropriate upsampling filter are disclosed. In particular, section II.C. discloses a comparison of motion tracking characteristics between equi-ripple, bi-linear, and Lagrangian upsampling filters.

In a fixed point representation, the numbers in parenthesis of Table 2B and Table 2C are 2's complement representations in 9 bits with the corresponding double precision numbers on the left. Depending upon the subpixel position of the motion prediction block in the downsampled reference image frame, one corresponding phase of the polyphase interpolation filter is used. Also, in an exemplary embodiment, more pixels on the left and right are needed to interpolate 17 horizontal pixels in the downsampled image frame. For example, in the case of 3:1 decimation, there are a maximum of 6 horizontally downsampled pixels for each input macroblock. However, when up-sampling, 9 horizontal pixels are needed to produce the corresponding motion prediction block values because an up-sampling filter requires more left and right pixels outside of the boundary for the filter to operate. Since the exemplary embodiment employs half pixel motion estimation, 17 pixels are needed to get 16 half pixels which can be either the first 16 integer pixels or the average values of nearest two pixel samples. A half pixel motion generator takes care of this. Table 3 illustrates mapping between subpixel positions and polyphase filter elements, and a number of left pixels which are needed in addition for the up-sampling process.

TABLE 3

| | Sub Pixel Position | Polyphase | No. of Extra Left Pixels | Coordinate Change |
|---|---|---|---|---|
| 3:1 Upsampling | 0 | 1 | 1 | x −> x − 1 |
| | 1 | 2 | 1 | x −> x − 1 |
| | 2 | 0 | 0 | |
| 2:1 Upsampling | 0 | 0 | 2 | x −> x − 2 |
| | 1 | 1 | 2 | x −> x − 2 |

Figure 3B:
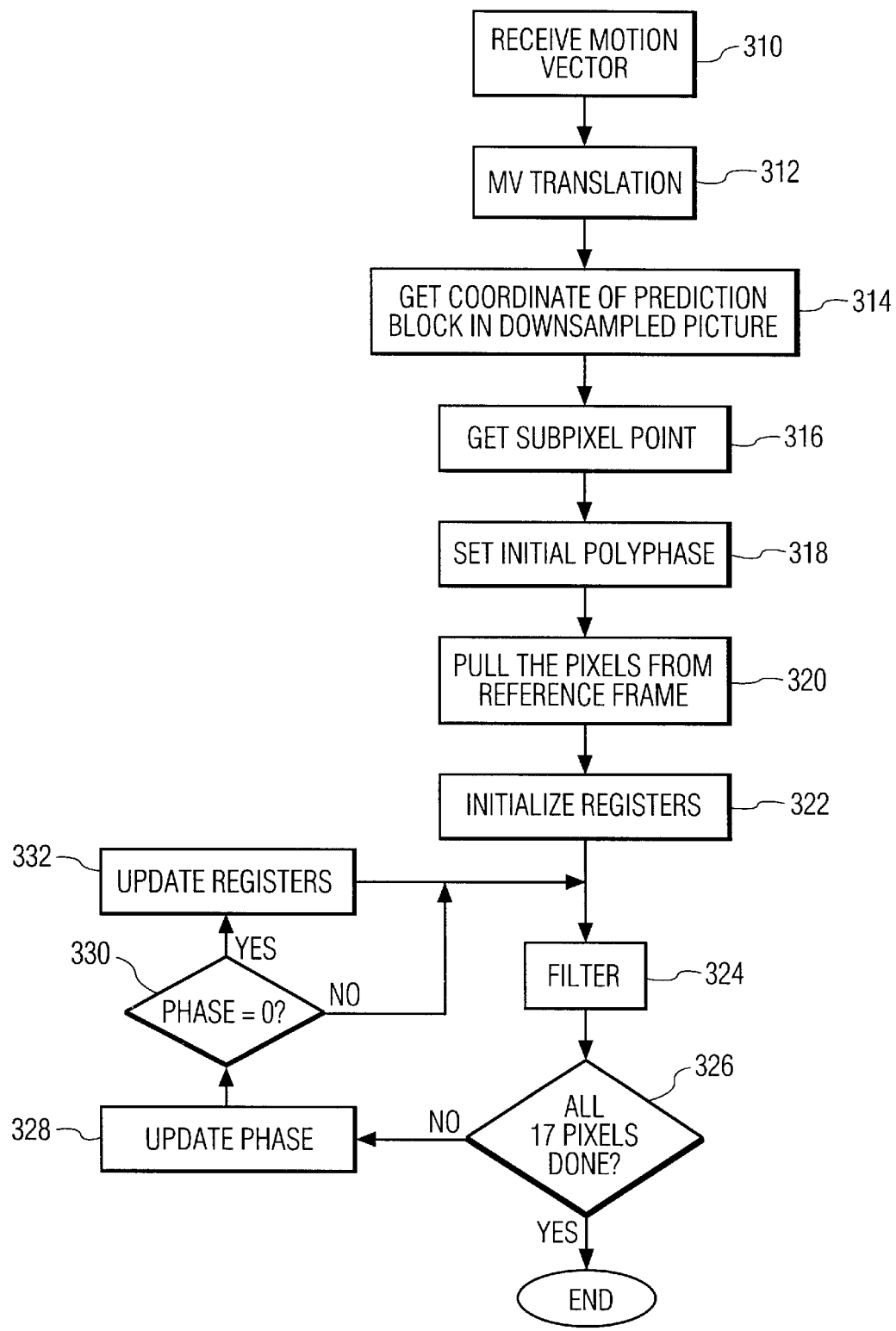
FIG. 3B shows the up-sampling process which is performed for each row of an input macroblock for an exemplary down conversion system.

FIG. 3B summarizes the up-sampling process which is performed for each row of an input macroblock. First, in step 310, the motion vector for the block of the input image frame being processed is received. At step 312, the motion vector is translated to correspond to the downsampled reference frame in memory. At step 314, the scaled motion vector is used to retrieve the coordinates of the prediction block stored in frame memory. At step 316 the subpixel point for the block is determined and the initial polyphase filter values for up-sampling are then retrieved at step 318. The identified pixels for the prediction block of the stored downsampled reference frame are then retrieved from memory at step 320.

Before the first pass at the filtering step 324, the registers are initialized at step 322, which for the exemplary embodiment entails loading the registers with the initial 3 or 5 pixel values. Then, after filtering step 324, the process determines at step 326 whether all pixels have been processed. In the exemplary embodiment 17 pixels are processed. If all pixels have been processed, the up-sampled block is complete. If all pixels have not been processed, the phase is updated at step 328, and the phase is checked, for the 0 value. If the phase is not zero, the registers must be updated for the next set of polyphase filter coefficients. Updating registers step 332 then simply updates the input pixels. In an exceptional case where the left-most pixel is outside of the block boundary, a previous pixel value may be repeated.

C. Upsampling for Good Motion Tracking

With reference to FIG. 2, described above in Section II.B., the up-sampling processor 226 retrieves a block of down sampled pixels from the reference frame memory 222. The up-sampling processor 226 then uses interpolation to generate pixels to provide a prediction block. This results in a prediction block with the same number of pixels as the reduced resolution residual block to which it is added in the adder 230.

The output of the adder 230 is then down sampled by the down sampling processor 232, stored in the reference frame memory 222, and then up sampled by the up-sampling processor 226 to generating the next prediction block. This cycle is repeated for each predicted frame, both P-frames and B-frames.

Since most coding schemes use multiple predicted frames between intra-coded frames, if image distortion is introduced by the up-sampling processor 226, this image distortion is also cycled through this process. The image distortion may be accumulated by the up-sampling processor 226 during each cycle. If many consecutive predicted frames are coded between intra-coded frames, this distortion may be amplified to the point where it becomes visible.

A source of such image distortion may be poor motion tracking characteristics of the up-sampling processor 226. Preferably, an up sampling filter in a down conversion system has both smooth low pass filtering and good motion tracking characteristics. Depending on the particular coding structure and the number of forward predicted frames between intra-coded frames, in some applications, the motion tracking property may take precedence over the low pass filtering to prevent visible motion jerkiness in a reproduced image.

Figure 4:
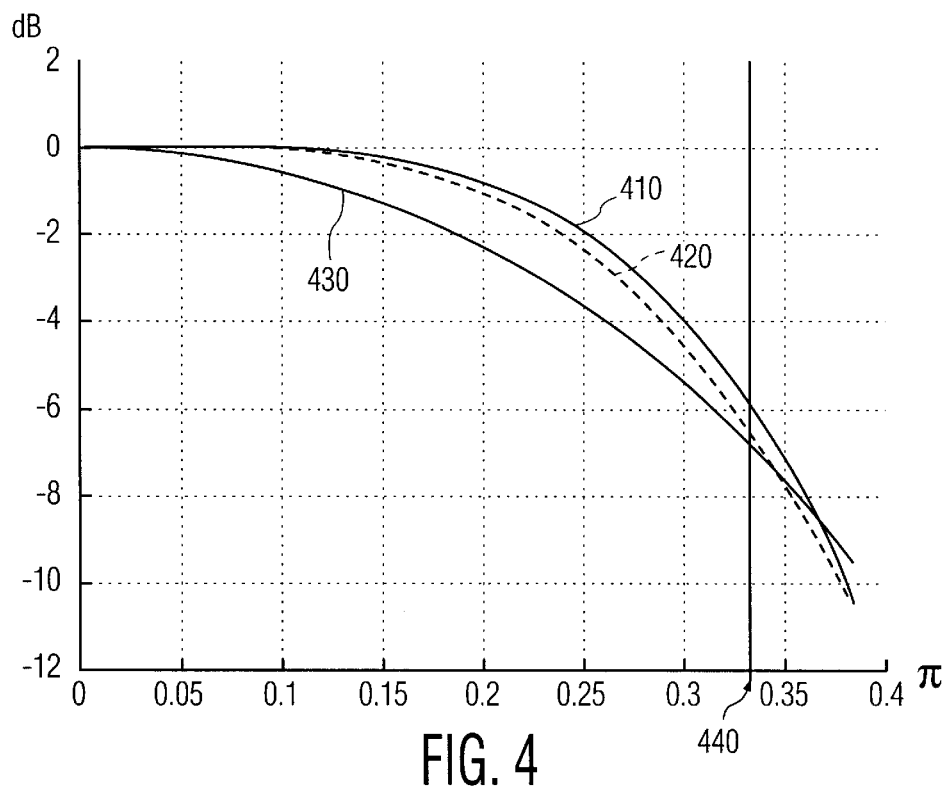
FIG. 4 shows the frequency characteristics of three different up-sampling filters.

FIG. 4 shows the frequency response (dB vs. frequency, where π corresponds to half of the sampling frequency) of three different upsampling filters in a 3:1 horizontal down conversion system: an equi-ripple filter frequency response 410, a bi-linear filter frequency response 430, and a Lagrangian filter frequency response 420. The cutoff frequency 440 is equal to π/3 for the 3:1 decimation system (π/2 for a 2:1 decimation system).

The following example illustrates the motion tracking properties of these filters in a 3:1 down conversion system. These examples concern an image of a rectangular pulse moving one pixel per frame in the upsample domain. For the purposes of this example, the coding structure consists of all forward predicted frames after an intra-frame. The image is interpolated based on every third pixel since the other pixels were thrown out during down sampling.

Figure 5A:
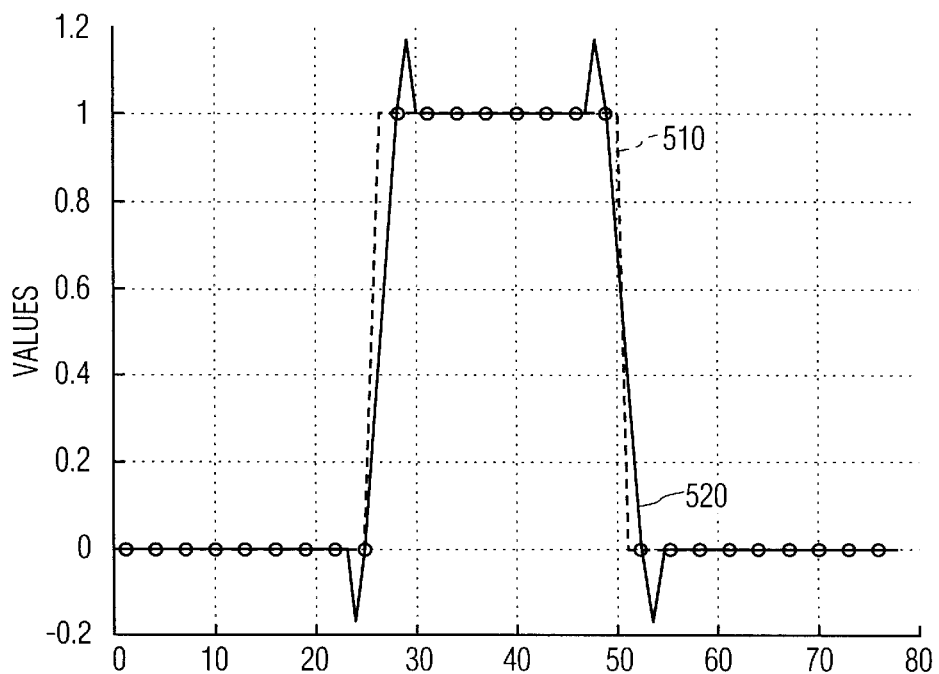
FIGS. 5A–5C show the interpolation of a rectangular pulse using three different up-sampling filters.
Figure 5B:
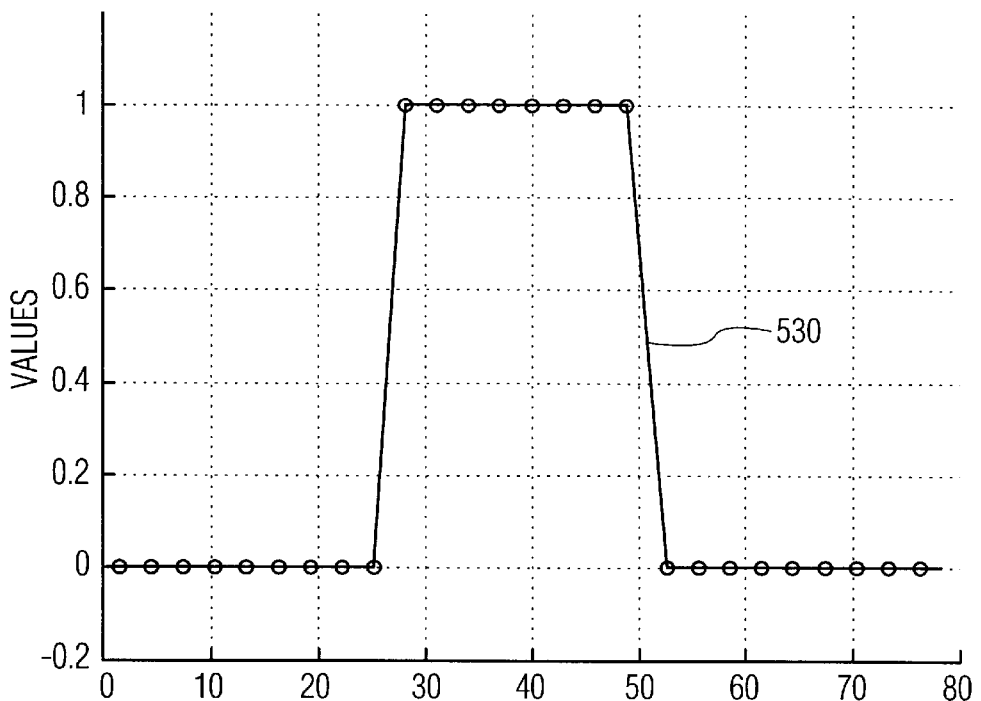
Figure 5C:
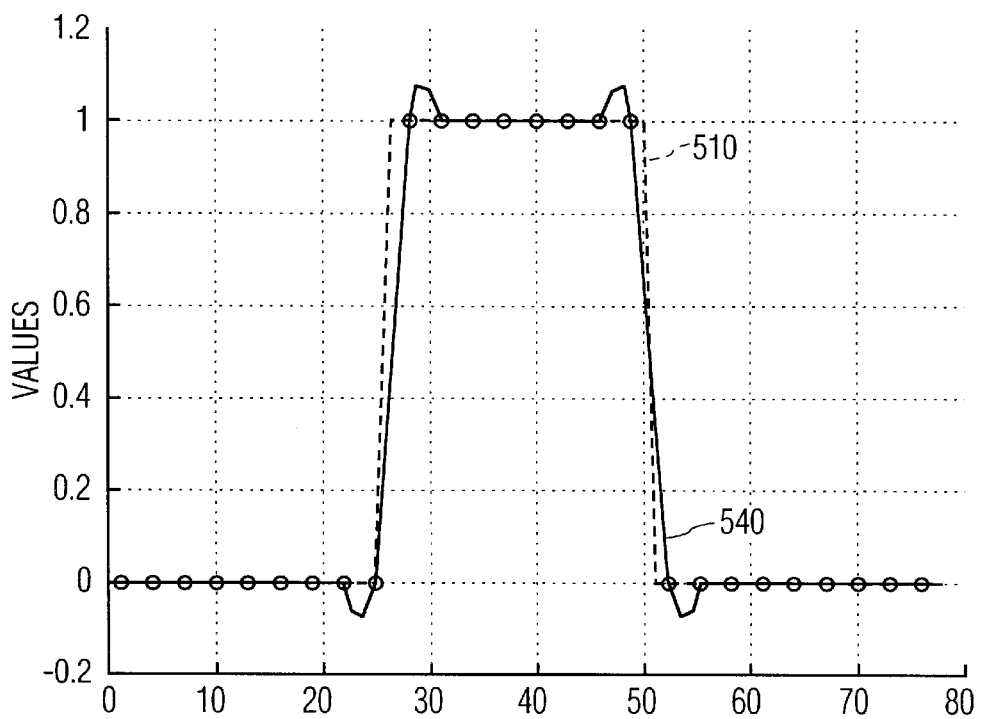

FIGS. 5A, 5B, and 5C, show the interpolations 520, 530, 540 of the rectangular pulse by an equi-ripple filter, a bi-linear filter,, and a third order, Lagrangian filter, respectively. The dashed lines 510 (not visible in FIG. 5B) represent the rectangular pulse being interpolated. Lagrangian interpolation is well known to those skilled in the art and is taught by Atkinson, *An Introduction to Numerical Analysis*, 107–10 (1978), which is incorporated herein by reference. As shown in FIGS. 5A–5C, the equi-ripple filter interpolation 520 has the most overshoot and undershoot in comparison to the Lagrangian filter interpolation 540 and the bi-linear filter interpolation 530.

FIGS. 6A, 6B, 6C, 6D, 6E, and 6F illustrate equi-ripple filter interpolations of the moving (one pixel per frame) rectangular pulse in predicted frame numbers 1, 2, 3, 5, 8 and 10, respectively. The dashed lines 610 in FIGS. 6A–6F represent the original image. The solid lines 620 in FIGS. 6A–6F represent the equi-ripple interpolations of the down-sampled original image 610. In frame number 5 shown in FIG. 6D, the interpolated pulse 620 is distorted and has moved ahead of the original pulse 610. In frame number 10 shown in FIG. 6F, the interpolated pulse 620 is even further ahead of the original pulse 610 than in frame number 5 shown in FIG. 6D.

Figure 6A:
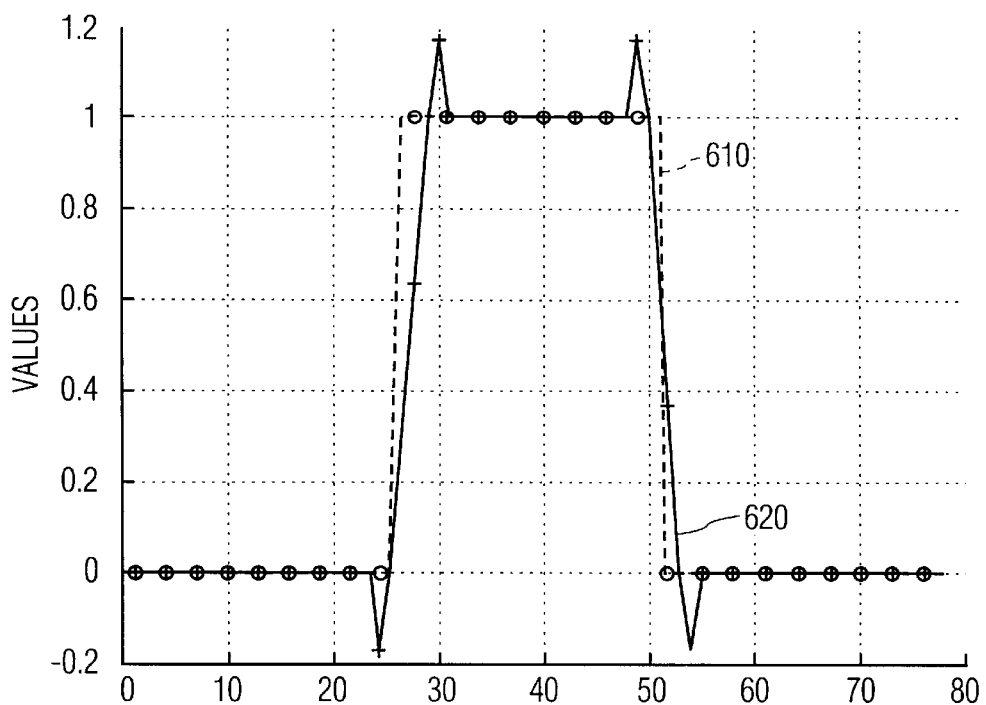
FIGS. 6A–6F show the interpolation of a moving rectangular pulse at predicted frame numbers 1, 2, 3, 5, 8, and 10, when using an equi-ripple up-sampling filter.
Figure 6B:
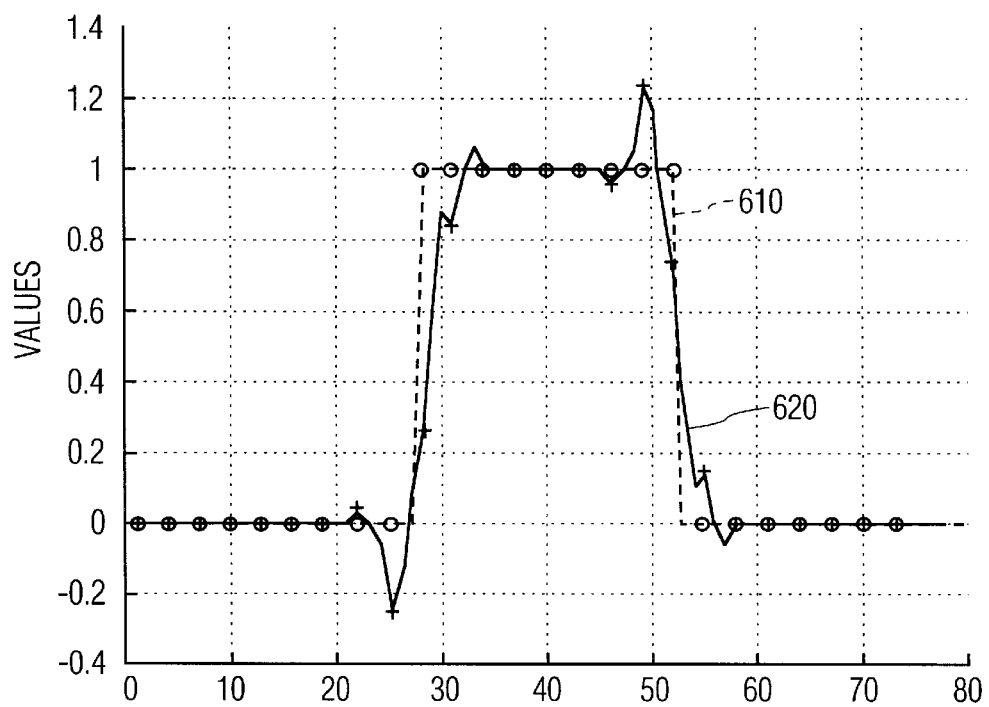
Figure 6C:
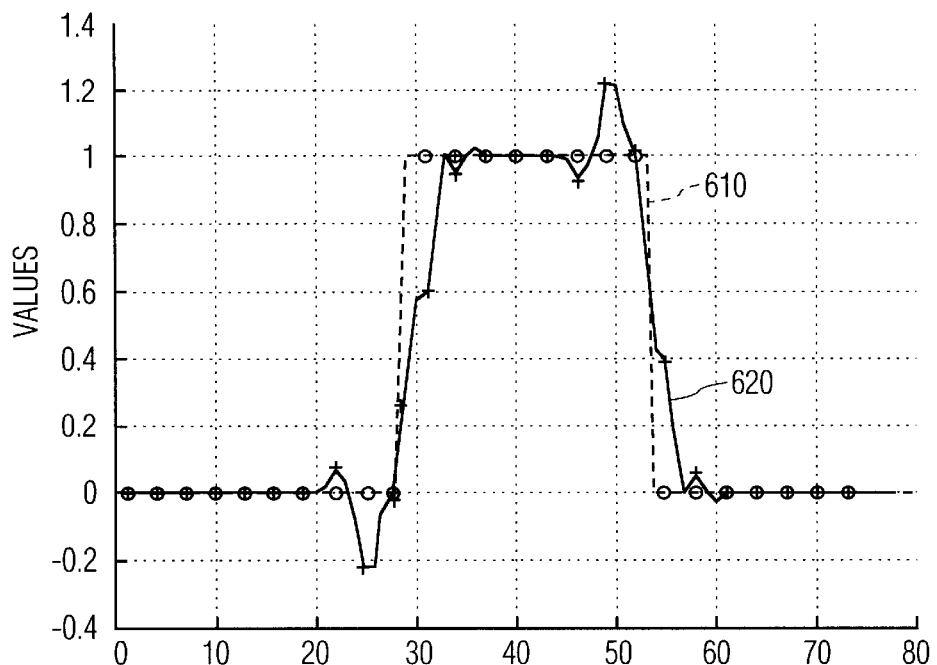
Figure 6D:
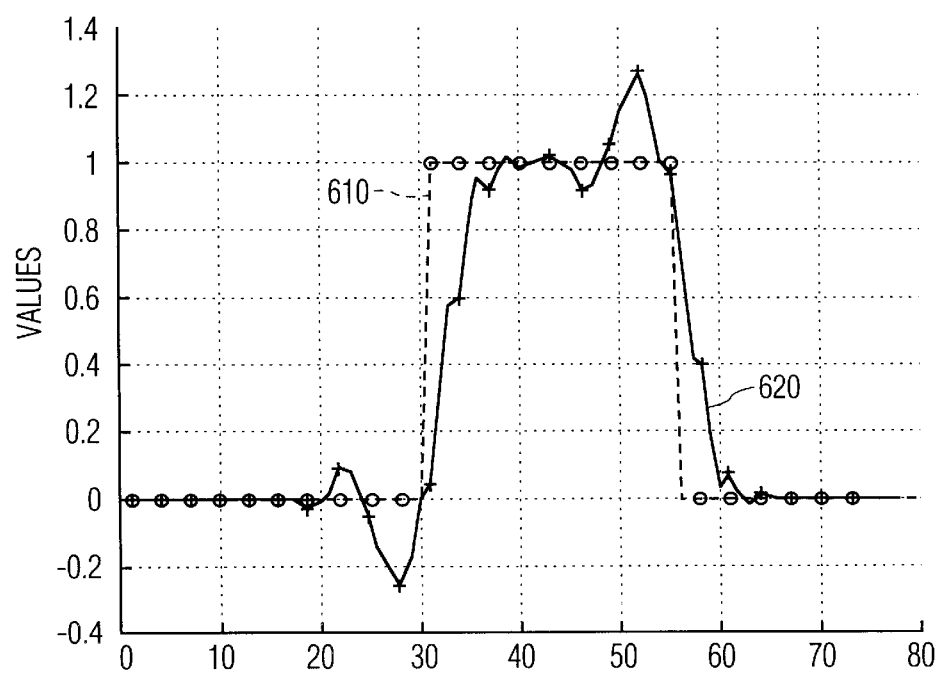
Figure 6E:
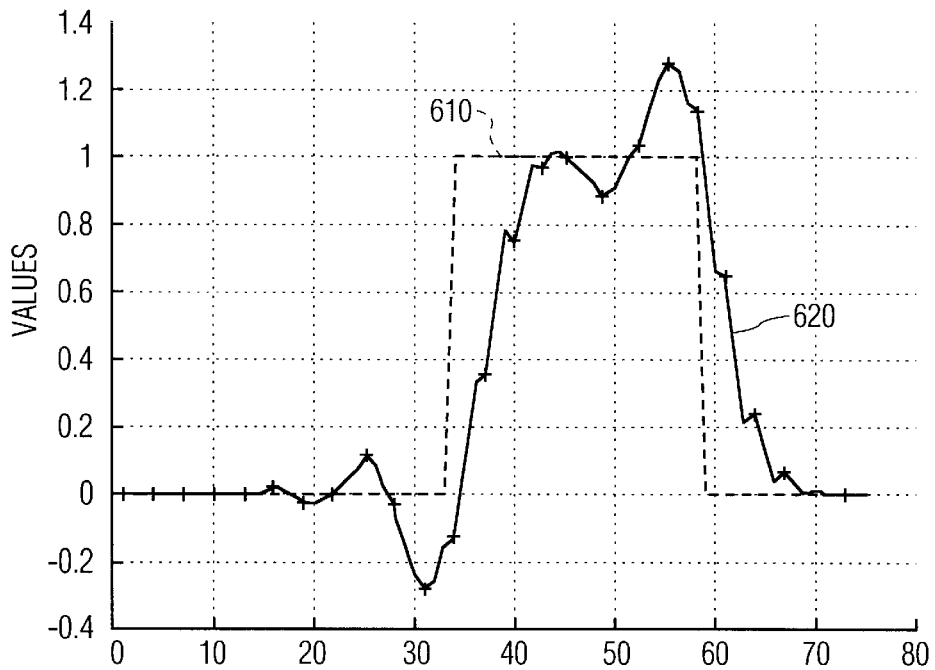
Figure 6F:
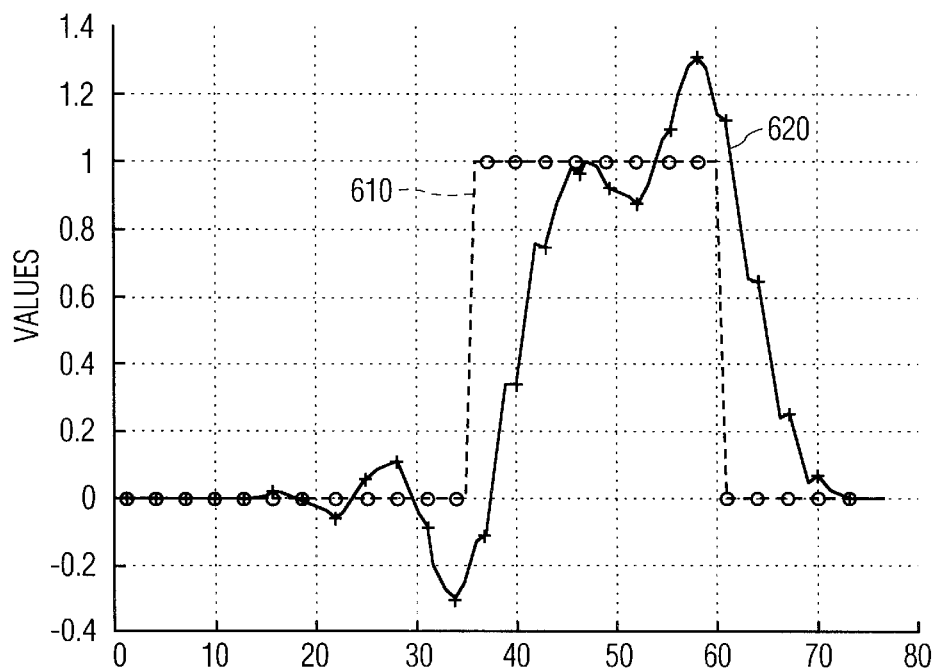

When the next intra-coded frame is displayed, the difference between the interpolated pulse 620 in FIG. 6F and the original pulse 610 will result in a "snapping back" problem. This is caused when the interpolated image in the predicted frames moves ahead of the motion of the original image and is then followed by an accurately represented intra-coded frame. Since the motion of edges in predicted frames are ahead of the motion of the original image, the next intra-coded frame may give a viewer the impression that the motion is now going backward.

For example, when the original image is an image of a person turning his head slowly to the left, the "snapping back" problem may result in the person's head "snapping back" to the right at every intra-coded frame when an equi-ripple filter of the above example is used for up-sampling. The severity of this type of distortion depends on the actual coding structure. For example, when applied to an IBBP coding structure, which has two Bi-directional frames between reference frames, the artifact is less noticable than in the example provided with reference to FIGS. 6A–6F where there were 10 consecutive forward predicted frames.

Figure 7:
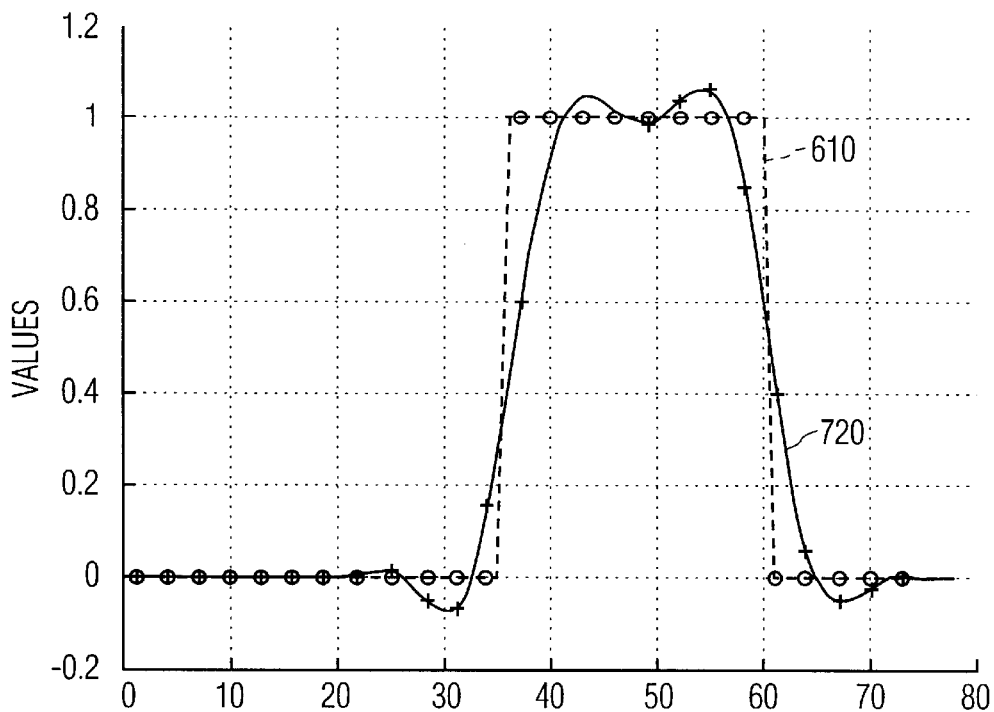
FIG. 7 shows the interpolation of a moving rectangular pulse at predicted frame number 10 when using a Lagrangian up-sampling filter.
Figure 8:
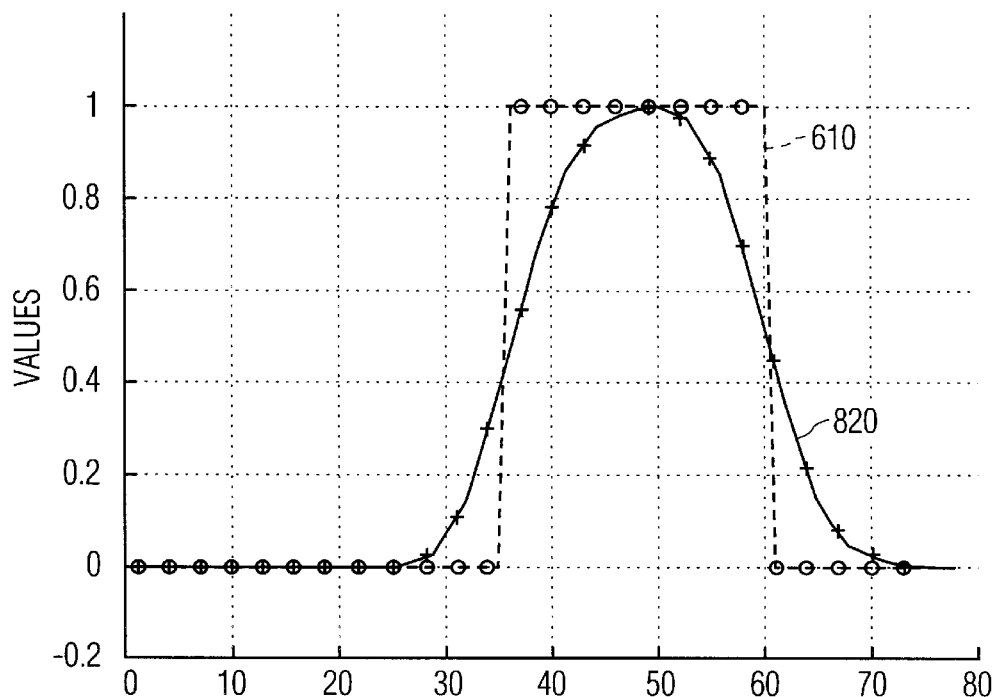
FIG. 8 shows the interpolation of a moving rectangular pulse at predicted frame number 10 when using a Bi-linear up-sampling filter.
Figure 10A:
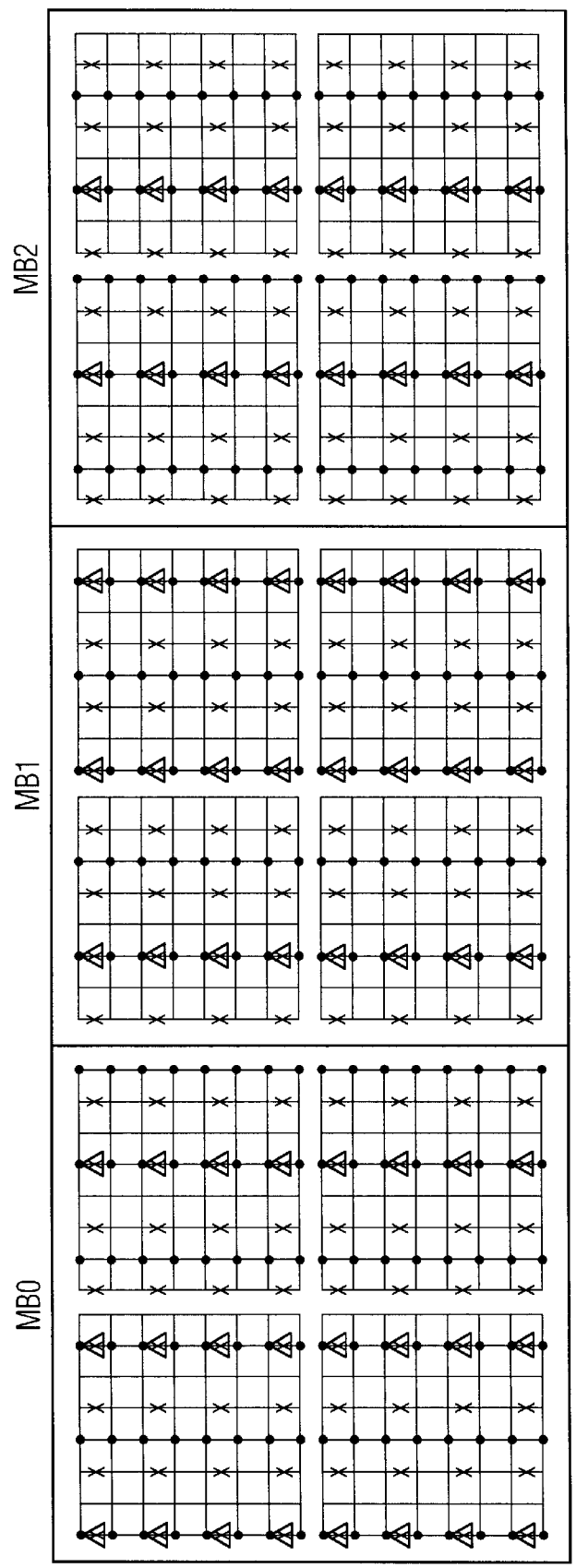
FIG. 10A shows input and decimated output pixels for 4:2:0 video signal using 3:1 decimation.
Figure 10B:
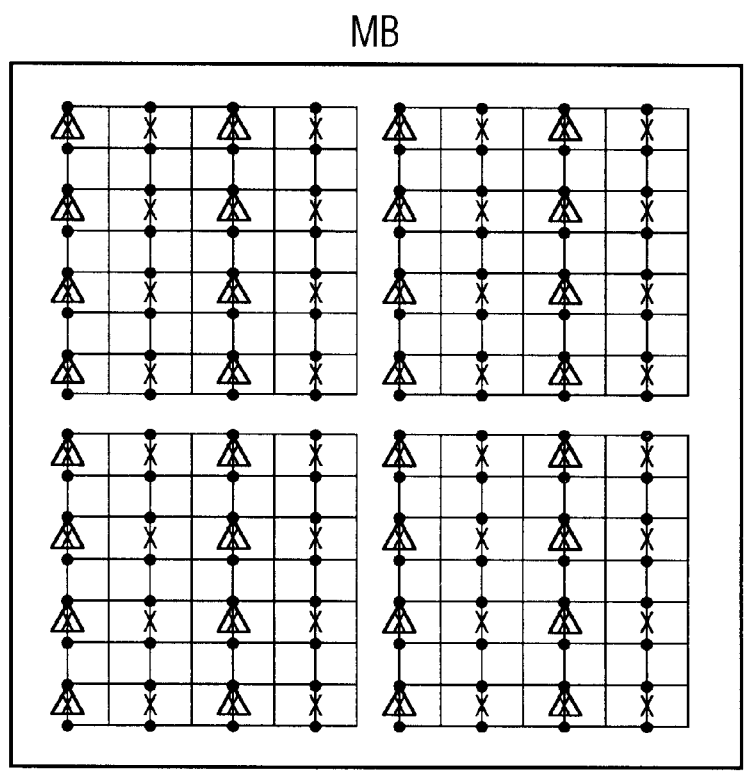
FIG. 10B shows input and decimated output pixels for 4:2:0 video signal using 2:1 decimation.

FIGS. 7 and 8 show images interpolated using Lagrangian and Bi-linear interpolators, respectively, for predicted frame number 10 under the same conditions as in FIG. 6F for an equi-ripple interpolator. In comparison to the equi-ripple interpolation 620 of FIG. 6F, the Lagrangian interpolation 720 in FIG. 7 and the Bi-linear interpolation 820 in FIG. 8 provide better motion tracking since their interpolated pulses 720, 820 are comparatively less ahead of the original image 610.

Overshoot and undershoot are factors to consider when analyzing the predicted pulse distortion. The equi-ripple interpolation 620 of FIG. 6F has 16% over/undershoot, the third order Lagrangian interpolation 720 of FIG. 7 has 6% over/undershoot, and the bi-linear interpolation 820 of FIG. 8 has no over/undershoot.

Comparison of FIGS. 6F, 7, and 8, shows that both a Lagrangian filter and a bi-linear filter provide better motion tracking characteristics than an equi-ripple filter. In an exemplary embodiment of the present invention, a bi-linear filter or a Lagrangian filter is used in up-sampling processor 226.

In another exemplary embodiment of the present invention, a Lagrangian filter is used in up-sampling processor 226. The third order Lagrangian filter has a better frequency response compared to a bilinear filter (as shown in FIG. 4) and has less over/undershoot than an equi-ripple filter (as shown by comparing FIGS. 6F and 7).

It is shown that a bilinear filter is the same as a first order Lagrangian filter. As known to those skilled in the art of numerical analysis, a Lagrangian interpolator, which is a polynomial interpolation for giving data points, may be designed as follows.

For giving (n+1) discrete data points, the n-th order Lagrangian interpolator is in the form of:

$$P_n(x) = \sum_{i=0}^{n} y_i \cdot l_i(x)$$

where $y_i$ is a function value at $x_i$ and $l_i(x)$ is a n-th order polynomial and is in the form of:

$$l_i(x) = \prod_{n \neq i} \frac{(x - x_n)}{(x_i - x_n)}$$

From the above equations it is evident that $l_i(x_n)=1$ for n=i and $l_i(x_n)=0$ for n≠i. Therefore, $P_n(X_n)=Y_n$ and the interpolation polynomial satisfies (n+1) discrete data points.

The first order Lagrangian interpolator is:

$$P_1(x) = \frac{(x - x_1)}{(x_0 - x_1)} \cdot y_0 + \frac{(x - x_0)}{(x_1 - x_0)} \cdot y_1$$

where $x_O < x < x_1$.

It is self-evident that the first order Lagrangian interpolator is a bilinear. The second order Lagrangian interpolator $P_2(x)$ and the third order Lagrangian interpolator $P_3(x)$ shown below may be derived from the above equations.

$$P_2(x) = \frac{(x - x_1) \cdot (x - x_2)}{(x_0 - x_1) \cdot (x_0 - x_2)} \cdot y_0 +$$
$$\frac{(x - x_0) \cdot (x - x_2)}{(x_1 - x_0) \cdot (x_1 - x_2)} \cdot y_1 + \frac{(x - x_0) \cdot (x - x_1)}{(x_2 - x_0) \cdot (x_2 - x_1)} \cdot y_2$$

$$P_3(x) = \frac{(x - x_1) \cdot (x - x_2) \cdot (x - x_3)}{(x_0 - x_1) \cdot (x_0 - x_2) \cdot (x_0 - x_3)} \cdot y_0 +$$
$$\frac{(x - x_0) \cdot (x - x_2) \cdot (x - x_3)}{(x_1 - x_0) \cdot (x_1 - x_2) \cdot (x_1 - x_3)} \cdot y_1 +$$
$$\frac{(x - x_0) \cdot (x - x_1) \cdot (x - x_3)}{(x_2 - x_0) \cdot (x_2 - x_1) \cdot (x_2 - x_3)} \cdot y_2 + \frac{(x - x_0) \cdot (x - x_1) \cdot (x - x_2)}{(x_3 - x_0) \cdot (x_3 - x_1) \cdot (x_3 - x_2)} \cdot y_3$$

For 2:1 upsampling, we are interested in interpolating points that are at half pixel locations between pixels in the decimated image. For 3:1 upsampling, we are interested in interpolating points that are at one-third or two-third pixel locations between pixels in the decimated image. For example, for a half pixel in the 2:1 upsampling case, $x-x_0=\frac{1}{2}$, $x-x_1=-\frac{1}{2}$ and $x_1-x_0=1$. By substituting these values, filter coefficients can be derived.

Table 7, below, shows the Lagrangian filter coefficients for a 2:1 up-sampling filter.

TABLE 7

| Order of Filter | PHASE 0 | PHASE 1 |
|---|---|---|
| First | (1,0) | (1/2,1/2) |
| Second | (0,1,0) | (−1,6,3)/8 |
| Third | (0,1,0,0) | (−1,9,9,−1)/16 |
| Fourth | (0,0,1,0,0) | (3,−20,90,60,−5)/128 |

Table 8, below, shows the Lagrangian filter coefficients for a 3:1 up-sampling filter.

TABLE 8

| Order of Filter | PHASE 0 | PHASE 1 | PHASE 2 | Input Shift |
|---|---|---|---|---|
| First | (1,0) | (2/3,1/3) | (1/3,2/3) | Phase 0 |
| Second | (0,1,0) | (−1/9,8/9,2/9) | (2/9,8/9,−1/9) | Phase 2 |
| Third | (0,1,0,0) | (−5,60,30,−4)/81 | (−4,30,60,−5)/81 | Phase 0 |
| Fourth | (0,0,1,0,0) | (5,−35,210,70,−7)/243 | (−7,70,210,−35,5)/243 | Phase 2 |

In Tables 7 and 8, phase 0 means integer pixel, phase 1 means a half pixel in the 2:1 case and one third point between pixels in the 3:1 case, and phase 2 means two third point between pixels in the 3:1 case. In the 2:1 case, input pixels are shifted for filtering at phase 0, but in the 3:1 case input shifting does not always occur at phase 0.

As known to those skilled in the art, as the order of a filter increases, the frequency response of the filter improves. Although many filter design methods are based strictly on improving the frequency response of a filter, in a down conversion system, the spatial response of the filter, which corresponds to its motion tracking characteristics, is an additional design consideration. Table 9 below shows the percentage over/under shoot for different order Lagrangian polyphase filters for a 3:1 down conversion system.

TABLE 9

| Order | Percentage Over/Undershoot |
|---|---|
| $2^{nd}$ | 11% |
| $3^{rd}$ | 6% |
| $4^{th}$ | 12.5% |

Human eyes are very sensitive to edge movement as long as it is traceable. The overshoot and undershoot of an upsampling filter deteriorates upsampling of a macroblock as more successive predicted frames are decoded and the results of previous upsample operations are recycled through the upsample filter. An upsampling filter design should be optimized to provide sufficient motion tracking characteristics while at the same time providing low pass filtering. In an exemplary embodiment of a 3:1 down conversion system, the up-sampling processor 226 uses the third order Lagrangian filter for interpolation of a down-sampled image. This results in a balance between the motion tracking characteristics and the low pass filtering response. The $4^{th}$ order filter may have a better frequency response than the $3^{rd}$ order filter but the $3^{rd}$ order filter has better motion tracking characteristics. Thus this particular design balances these factors and makes a tradeoff between them. As discussed above, the coding structure of a particular system determines where this balance should fall.

D. DCT Domain Filtering Employing Weighting of DCT Coefficients

The exemplary embodiment of the down conversion system includes the DCT filter 216 processing the DCT coefficients in the frequency domain, which replaces a lowpass filter in the spatial domain. There are several advantages in DCT domain filtering instead of spatial domain filtering for DCT coded pictures, such as contemplated by the MPEG or JPEG standards. Most notably, a DCT domain filter is computationally more efficient and requires less hardware than a spatial domain filter applied to the spatial pixels. For example, a spatial filter having N taps may use as many as N multiplications and additions for each spatial pixel sample value. This compares to only one multiplication in the DCT domain filter.

The simplest DCT domain filter is a truncation of the high frequency DCT coefficients. However, truncation of high frequency DCT coefficients does not result in a smooth filter and has drawbacks such as "ringing" near edges in the decoded picture. The DCT domain lowpass filter of the exemplary embodiment of the invention is derived from a block mirror filter in the spatial domain. The filter coefficient values for the block mirror filter are, for example, optimized in the spatial domain, and these values are then converted into coefficients of the DCT domain filter.

Although the exemplary embodiment shows DCT domain filtering in only the horizontal direction, DCT domain filtering can be done in either the horizontal or the vertical direction or both by combining horizontal and vertical filters.

E. DCT Domain Filter Coefficients

One exemplary filter of the present invention is derived from two constraints: first, the filter processes image data on a block by block basis for each block of the image without using information from other blocks of the same picture or from previous pictures; and second, the filter reduces visibility of block boundaries which occur when the filter processes boundary pixel values.

According to the first constraint, in the DCT based compression of an MPEG image sequence, for example, blocks of N X N DCT coefficients yield blocks of N X N spatial pixel values. Consequently, an exemplary embodiment of the present invention implements a DCT domain filter which only processes blocks of the currently received picture.

According to the second constraint, if the filter is simply applied to a block of spatial pixel values, there is a transition of filtering on the block boundary which is caused by an insufficient number spatial pixel values beyond the boundary to fill the residual of the filter. That is to say, the edge of a block cannot be properly filtered because the N-tap filter has respective input pixels for only N/2 or for (N/2)-1 taps depending upon whether N is even or odd. The remaining input pixels are beyond the boundary of the block. Several methods of supplying pixel values exist: 1) repeat a predetermined constant pixel value beyond a boundary; 2) repeat the same pixel value as the boundary pixel value; and 3) mirror the pixel values of the block to form previous and subsequent blocks of pixel values adjacent to the processed block. Without prior information on the contents of the previous or subsequent block, the mirroring method is considered as a preferred method. Therefore, an embodiment of the present invention employs this mirroring method for the filter and is termed a "block mirror filter."

The following describes an exemplary embodiment which implements a horizontal block mirror filter that lowpass filters 8 input spatial pixel sample values of a block. If the size of the input block is an 8×8 block matrix of pixel sample values, then a horizontal filtering can be done by applying the block mirror filter to each row of 8 pixel sample values. It will be apparent to one skilled in the art that the filtering process can be implemented by applying the filter coefficients columnwise of the block matrix, or that multidimensional filtering may be accomplished by filtering of the rows and then filtering the columns of the block matrix.

A block mirror filter in the spatial domain can be equivalently implemented in the DCT domain by weighting DCT coefficients, as taught by Kim et. al., "DCT Domain Filter for ATV Down Conversion", IEEE Trans. on Consumer Electronics, Vol. 43 (4) 1074–8 (1997). FIG. 4 shows the correspondence between the input pixel values $x_0$ through $X_7$ (group XO) for an exemplary mirror filter for 8 input pixels which employs a 15 tap spatial filter represented by tap values $h_0$ through $h_{14}$. The input pixels are mirrored on the left side of group X0, shown as group X1, and on the right side of group X0, shown as group X2. The output pixel value of the filter is the sum of 15 multiplications of the filter tap values with the corresponding pixel sample values. FIG. 4 illustrates the multiplication pairs for the first and second output pixel values.

F. Exemplary Embodiment of the Block Mirror Filter

One embodiment of the exemplary block mirror filtering of the present invention is derived as by the following steps: 1) a one dimensional lowpass symmetric filter is chosen with an odd number of taps, which is less than 2N taps; 2) the filter coefficients are increased to 2N values by padding with zero's; 3) the filter coefficients are rearranged so that the original middle coefficient goes to the zeroth position by a left circular shift; 4) the DFT coefficients of the rearranged filter coefficients are determined; 5) the DCT filter coefficients are multiplied with the real number DFT coefficients of the input block; and 6) the inverse discrete cosine transform (IDCT) of the filtered DCT coefficients is performed by multiplying by IDCT coefficients to provide a block of lowpass-filtered pixels prepared for decimation.

The cutoff frequency of the lowpass filter is determined by the decimation ratio. For one exemplary embodiment, the cutoff frequency is $\pi/3$ for a 3:1 decimation and $\pi/2$ for a 2:1 decimation, where n corresponds to half of the sampling frequency.

A DCT domain filter in MPEG and JPEG decoders allows memory requirements to be reduced because the inverse quantizer and IDCT processing of blocks already exists in the decoder of the prior art, and only the additional scalar multiplication of DCT coefficients by the DCT domain filter coefficients is required. Therefore, a separate DCT domain filter block multiplication is not physically required in a particular implementation; another embodiment of the present invention simply combines the DCT domain filter coefficients with the IDCT processing coefficients.

For the exemplary down conversion system of the present invention, the horizontal filtering and decimations of the DCT coefficients were considered; and the following are two exemplary implementations for:

1. 1920H by 1080 V interlace to 640H by 1080 V interlace conversion (Horizontal 3:1 decimation).
2. 1280H by 720 V progressive to 640H by 720 V progressive conversion (Horizontal 2:1 Decimation)

Table 4 shows the DCT block mirror filter (weighting) coefficients; in Table 4 the numbers in the parenthesis are 10 bit 2's complementary representations. The "*" of Table 4 implies an out of bound value for the 10 bit 2's complement representation because the value is more than 1; however, as is known by one skilled in the art, the multiplication of the column coefficients of the block by the value indicated by the * can be easily implemented by adding the coefficient value to the coefficient multiplied by the fractional value (remainder) of the filter value.

TABLE 4

| | 3:1 Decimation | 2:1 Decimation |
|---|---|---|
| H[0] | 1.000000000000000 (511) | 1.0000000000000000 (511) |
| H[1] | 0.986934590759779 (505) | 1.0169628157945179 (*) |
| H[2] | 0.790833583171840 (405) | 1.0000000000000000 (511) |
| H[3] | 0.334720213357461 (171) | 0.82247656390475166 (421) |
| H[4] | −0.0323463361027473 (−17) | 0.46728234862006007 (239) |
| H[5] | −0.0377450036954524 (−19) | 0.10634261847436199 (54) |

TABLE 4-continued

| | 3:1 Decimation | 2:1 Decimation |
|---|---|---|
| H[6] | −0.0726889747390758 (37) | −0.052131780559049545 (−27) |
| H[7] | 0.00954287167337307 (5) | −0.003489737967467715 (−2) |

These horizontal DCT filter coefficients weight each column in the block of 8×8 DCT coefficients of the encoded video image. For example, the DCT coefficients of column zero are weighted by H[0], and the DCT coefficients of first column is weighted by H[1] and so on.

The above discussion illustrates a horizontal filter implementation using a one-dimensional DCT. As is known in the digital signal processing art, such processing can be extended to two-dimensional systems. For a two-dimensional system, the input sequence is now represented as a matrix of values, showing the sequence to be periodic in the column sequence with period M, and periodic in the row sequence with period N, N and M being integers. A two-dimensional DCT can be implemented as a one dimensional DCT performed on the columns of the input sequence, and then a second one dimensional DCT performed on the rows of the DCT processed input sequence. Also, as is known in the art, a two-dimensional IDCT can be implemented as a single process.

G. Down Sampling

Down sampling is accomplished by the down fling processor 232 to reduce the number of pixels in the downconverted image. FIG. 5A shows the input and decimated output pixels for 4:2:0 chrominance type for 3:1 decimation. FIG. 5B shows the input and decimated output pixels for 4:2:0 chrominance type 2:1 decimation. Table 5 gives the legend identification for the Luminance an Chrominance pixels of FIG. 5A and FIG. 5B. The pixel positions before and after the down conversion of FIGS. 5A and 5B are the interlaced (3:1 decimation) and progressive (2:1 decimation) cases respectively

TABLE 5

| Symbol | Pixel |
|---|---|
| + | Luminance Before Decimation |
| x | Chrominance Before Decimation |
| • | Luminance After decimation |
| Δ | Chrominance After Decimation |

For down sampling of the interlaced image, which may be the conversion from a 1920 by 1080 pixel size to a 640 by 1080 pixel size, every third pixel is decimated on the horizontal axis. For the exemplary 3:1 decimation, there are three different macroblock types after the down conversion process. In FIG. 5A, original macroblocks (MBs) were denoted by MB0, MB1, MB2. The down sampled luminance pixels in MB0 start at the first pixel in the original macroblock, but in MB1 and MB2 the down-sampled pixels start at the third and the second pixels. Also the number of down-sampled pixels in each macroblock are not the same. In MB0, there are 6 down-sampled pixels horizontally, but 5 pixels in MB1 and MB2. These three MB types are repeating, therefore Modulo 3 arithmetic is to be applied. Table 6 summarizes the number of downsampling pixels and offsets for each input macroblock MB0, MB1, MB2.

TABLE 6

|  | MB0 | MB1 | MB2 |
|---|---|---|---|
| No. of Down Sampled Luminance Pixels | 6 | 5 | 5 |
| No. of Down Sampled Chrominance Pixels | 3 | 3 | 2 |
| Offset of 1st Down Sampled Luminance Pixel | 0 | 2 | 1 |
| Offset of 1st Down Sampled Chrominance Pixel | 0 | 1 | 2 |

For downsampling of the progressive format image the signal is subsampled for every second sample horizontally.

While exemplary embodiments of the invention have been shown and described herein, it will be understood that such embodiments are provided by way of example only. Numerous variations, changes, and substitutions will occur to those is skilled in the art without departing from the spirit of the invention. Accordingly, it is intended that the appended claims cover all such variations as fall within the scope of the invention.

What is claimed:

1. An apparatus for forming a third set of low resolution down-sampled predicted pixel values corresponding to a current frame of a video signal from a second set of low resolution pixel values corresponding to a residual image of the current frame of the video signal and from a first set of down-sampled low resolution pixel values corresponding to at least one reference frame of the video signal, the apparatus comprising:

memory means for storing the first set of down-sampled low resolution pixel values;

up-sampling means for receiving the first set of down-sampled low resolution reference pixel values from the memory means and using Lagrangian interpolation to convert the first set of down-sampled low resolution pixel values into a set of up-sampled low resolution pixel values corresponding to the at least one reference frame of the video signal;

summing means for adding the second set of low resolution pixel values corresponding to the residual image of the current frame of the video signal to the set of up-sampled low resolution pixel values corresponding to the at least one reference frame of the video signal to form a set of low resolution predicted pixel values corresponding to the current frame of the video signal; and decimating means for deleting selected ones of the set of low resolution pixel values corresponding to the current frame of the video signal to generate the third set of low resolution down-sampled predicted pixel values corresponding to the current frame of the video signal for storage in the memory means as farther reference pixel values to be used to generate further predicted frames of video signals in a sequence of predicted frames;

wherein the sequence of predicted frames of video signals generated using the Lagrangian interpolation exhibits substantially uniform motion racking.

2. An apparatus according to claim 1, wherein the video signal is an encoded frequency-domain transformed high resolution video signal, and the apparatus farther includes:

receiving means for receiving the encoded video signal as a set of high resolution frequency-domain video coefficient values;

down-conversion filter means for receiving and weighting the set of high resolution frequency-domain video coefficient values to form a set of frequency-domain video coefficients corresponding to the residual image of the current frame of the video signal;

inverse-transform means for transforming the set of frequency-domain video coefficients corresponding to the residual image of the current frame of the videosignal to provide the second set of down-sampled low resolution pixel values.

3. An apparatus according to claim 1, wherein the decimating means performs a 3:1 decimation and the upsampling means includes one of a second order Lagrangian filter, a third order Lagrangian filter and a fourth order Lagrangian filter.

4. An apparatus according to claim 3, wherein the upsampling means includes a third order Lagrangian filter.

5. An apparatus according to claim 1, wherein the decimating means performs a 2:1 decimation and the up-sampling means includes one of a second order Lagrangian filter, a third order Lagrangian filter and a fourth order Lagrangian filter.

6. An apparatus according to claim 5, wherein the upsampling means includes a third order Lagrangian filter.

7. A method for forming a third set of low resolution down-sampled pixel values corresponding to a current frame of a video signal from a second set of low resolution pixel values corresponding to a residual image of the current frame of the video signal and from a first set of down-sampled low resolution pixel values corresponding to at least one reference frame of the video signal, the method comprising the steps of:

(a) storing the first set of down-sampled low resolution pixel values as reference pixel values in a memory;

(b) receiving the first set of down-sampled low resolution reference pixel values from the memory and using Lagrangian interpolation to convert the first set of down-sampled low resolution reference pixel values into a set of up-sampled low resolution pixel values corresponding to the at least one reference frame of the video signal;

(c) adding the second set of low resolution pixel values corresponding to the residual image of the current frame of the video signal to the set of up-sampled low resolution pixel values corresponding to the at least one reference frame of the video signal to form a set of low resolution predicted pixel values corresponding to the current frame of the video signal; and (d) deleting selected ones of the set of low resolution pixel values corresponding to the current frame of the video signal to generate the third set of low resolution down-sampled predicted pixel values corresponding to the current frame of the video signal for storage in the memory as filter reference pixel values to be used to generate further predicted frames of video signals in a sequence of predicted frames;

wherein the sequence of predicted frames of video signals generated using the Lagrangian interpolation exhibits substantially uniform motion tracking.

8. A method according to claim 7, wherein the video signal is an encoded frequency-domain transformed high-resolution video signal and the method further comprises the steps of:

receiving the encoded video signal as a set of high resolution frequency-domain video coefficient values;

weighting the set of high resolution frequency-domain video coefficient values to form a set of frequency-domain video coefficients corresponding to the residual image of the current frame of the video signal;

transforming the set of frequency-domain video coefficients corresponding to the residual image of the current frame of the video signal into a set of pixel values corresponding to the residual image of the current frame of the video signal to generate the second set of down-sampled low resolution pixel values.

9. A method for forming a low resolution video signal according to claim 7 wherein:
   in step (b), the step of using Lagrangian interpolation includes the step of using one of first order Lagrangian interpolation, second order Lagrangian interpolation and third order Lagrangian interpolation; and
   step (d) includes the step of decimating the set of low resolution pixel values corresponding to the current frame of the video signal by 3:1 to generate the third set of low resolution down-sampled pixel values.

10. A method for forming a low-resolution video signal according to claim 9, wherein step (b) includes the step of using third order Lagrangian interpolation.

11. A method for forming a low resolution video signal according to claim 7 wherein:
   in step (b), the step of using Lagrangian interpolation includes the step of using one of first order Lagrangian interpolation, second order Lagrangian interpolation and third order Lagrangan interpolation; and
   step (d) includes the step of decimating the set of low resolution pixel values corresponding to the current frame of the video signal by 2:1 to generate the third set of low resolution down-sampled pixel values.

12. A method for forming a low-resolution video signal according to claim 11, wherein step (b) includes the step of using third order Lagrangian interpolation.

* * * * *